US010316917B2

(12) United States Patent
Jones

(10) Patent No.: US 10,316,917 B2
(45) Date of Patent: Jun. 11, 2019

(54) HYDRAULIC POWER TAKE-OFF WITH MULTIPLE-FORCE BRAKE SYSTEM FOR INDUSTRIAL DRIVES

(71) Applicant: Twin Disc, Inc., Racine, WI (US)

(72) Inventor: Darrel A. Jones, Kenosha, WI (US)

(73) Assignee: Twin Disc, Inc., Racine, WI (US)

( * ) Notice: Subject to any disclaimer, the term of this patent is extended or adjusted under 35 U.S.C. 154(b) by 60 days.

(21) Appl. No.: 15/433,178

(22) Filed: Feb. 15, 2017

(65) Prior Publication Data
US 2017/0241496 A1 Aug. 24, 2017

Related U.S. Application Data

(60) Provisional application No. 62/296,928, filed on Feb. 18, 2016.

(51) Int. Cl.
| | |
|---|---|
| *F16D 67/04* | (2006.01) |
| *F16D 55/38* | (2006.01) |
| *F16D 25/0638* | (2006.01) |
| *F16D 55/24* | (2006.01) |
| *F16D 121/04* | (2012.01) |
| *F16D 123/00* | (2012.01) |
| *F16D 125/58* | (2012.01) |

(52) U.S. Cl.
CPC ......... *F16D 67/04* (2013.01); *F16D 25/0638* (2013.01); *F16D 55/24* (2013.01); *F16D 55/38* (2013.01); *F16D 2121/04* (2013.01); *F16D 2123/00* (2013.01); *F16D 2125/582* (2013.01)

(58) Field of Classification Search
None
See application file for complete search history.

(56) References Cited

U.S. PATENT DOCUMENTS

| | | |
|---|---|---|
| 4,207,968 A | 6/1980 | Chamberlain |
| 4,412,603 A | 11/1983 | Bischoff |
| 5,293,966 A | 3/1994 | Chareire |
| (Continued) | | |

FOREIGN PATENT DOCUMENTS

JP 2005083488 3/2005

OTHER PUBLICATIONS

ISR & Written Opinion dated May 11, 2017 in corresponding PCT/US2017/017880.

*Primary Examiner* — Timothy Hannon
(74) *Attorney, Agent, or Firm* — Boyle Frederickson S.C.

(57) ABSTRACT

A hydraulic power take-off is provided for use with industrial drives. The hydraulic power take-off has a multiple-force brake system that facilitates actively slowing large inertial loads associated with a heavy rotating mass of an industrial machine. The multiple-force brake system applies different braking forces at different times to control deceleration of the heavy rotating mass in the industrial machine to reduce its stopping time. The multiple-force brake system may include a clutch assembly and a brake assembly. A control system may control the clutch and brake assemblies to provide the multiple-force brake system a relatively higher energy brake engagement state and a relatively lower energy brake engagement. This may include alternating between the higher and lower energy brake engagement states to pulse between high and low pressure braking to facilitate cooling of the system while slowing the large inertial loads.

17 Claims, 10 Drawing Sheets

(56) References Cited

U.S. PATENT DOCUMENTS

| | | |
|---|---|---|
| 6,142,274 A | 11/2000 | Warner |
| 6,155,390 A | 12/2000 | Ozeohowski |
| 6,264,009 B1 | 7/2001 | Johnson |
| 6,305,515 B1 | 10/2001 | Heidenreich et al. |
| 8,783,423 B2 | 7/2014 | Schrewe |
| 2002/0130655 A1* | 9/2002 | Okada .................... B60T 8/171 324/174 |
| 2002/0162715 A1 | 11/2002 | Haerr et al. |
| 2004/0195069 A1* | 10/2004 | Bell ........................ F16D 25/12 192/13 R |
| 2005/0258012 A1 | 11/2005 | Graves |
| 2014/0102227 A1 | 4/2014 | Mayer |
| 2014/0165748 A1 | 6/2014 | Alford et al. |

* cited by examiner

HYDRAULIC POWER TAKE-OFF WITH MULTIPLE-FORCE BRAKE SYSTEM FOR INDUSTRIAL DRIVES

CROSS REFERENCE TO RELATED APPLICATIONS

This application claims a benefit of priority under 35 USC § 119 to U.S. Provisional Patent Application No. 62/296,928 filed Feb. 18, 2016, the entire contents of which are hereby expressly incorporated by reference into the present application.

BACKGROUND OF THE INVENTION

Field of the Invention

The preferred embodiments are directed to industrial drives of industrial equipment and, more particularly, to a hydraulic PTO (power take-off) that can provide a dynamic braking action to large rotating components of industrial machines for reducing rotational speed of corresponding large inertial loads.

Discussion of the Related Art

Industrial equipment like industrial chippers, shredders, grinders, and crushers having large rotating components that are driven with robust industrial drives. Suitable industrial drives include hydraulic PTOs with hydraulic clutches that selectively connect and disconnect power between the driven industrial equipment and prime movers. Some hydraulic PTOs have internal brake assemblies for stopping and holding the large rotating components of the industrial equipment.

For simplicity and reliability in most applications, each internal brake assembly of a hydraulic PTO typically has a single clutch plate with a single braking surface. Single plate brake assemblies are limited in their use for stopping large rotating components of industrial equipment. That is because the large rotating components have enough mass to establish large inertial loads, which present numerous challenges while trying to actively brake, especially with single plate brake assemblies. Actively braking the large rotating components creates substantial heat in brake assemblies, potentially creating over-heating issues. Instead of actively braking, heat-induced issues in brake assemblies are avoided by allowing the rotating components to coast down to slow speeds before using the brake assemblies for slow speed final-stopping and holding or parking-type brake applications. Some rotating components are allowed to coast down to about 40 RPM (rotations per minute) or less before performing the brake application that performs the slow speed final-stopping. This coast-down process can take several minutes or more, during which time no servicing or other procedures can be performed on the industrial equipment.

Overall, a hydraulic PTO for use in an industrial drive of a piece of industrial equipment that allows for active braking of large rotating components of the industrial equipment to reducing stopping time was desired.

SUMMARY AND OBJECTS OF THE INVENTION

The preferred embodiments overcome the above-noted drawbacks by providing a hydraulic PTO (power take-off) for use with an industrial drive and by having a multiple-force brake system that is controlled to alternatingly apply relatively higher and lower energy brake engagement states to slow large rotating components with large inertial loads while maintaining suitable operating temperatures within the hydraulic PTO.

In accordance with a first aspect of the invention, a hydraulic PTO is provided that includes a PTO housing mounted between a prime mover and a piece of driven industrial equipment. An output shaft extends from the PTO housing to selectively deliver power to the piece of driven equipment for driving rotation of a rotatable component of the piece of driven industrial equipment. A multiple-force brake system is configured to apply different braking forces at different times to control deceleration of the rotatable component of the piece of driven industrial equipment while stopping the rotation of the rotatable component of the piece of driven industrial equipment. A control system may be configured to control the multiple-force brake system to alternately pulse applications of high-energy brake engagement and low-energy brake engagement. The multiple-force brake system may include a brake assembly with first and second sets of springs that provide first and second forces that correspond to the high-energy brake engagement and low-energy brake engagement. The first set of springs may be arranged to bias a clutch piston of a clutch assembly of the hydraulic PTO to disengage the clutch assembly and apply the force that corresponds to the high-energy brake engagement. The second set of springs may be arranged to bias a brake piston of a brake assembly and apply the force that corresponds to the low-energy brake engagement.

In accordance with another aspect of the invention, a hydraulic PTO for use with industrial drives is provided that has an input end receiving power from a prime mover and an output end having an output shaft selectively rotating to deliver power to a piece of industrial equipment. A clutch assembly receives power from the prime mover and selectively transmits the power into rotation of the output shaft. The clutch assembly can be engaged to transmit power through the clutch assembly for rotating the output shaft and disengaged to not transmit power through the clutch assembly. The clutch assembly may include a clutch pack having interleaved clutch plates clamped together for rotation in unison with each other when the clutch assembly is engaged and unclamped with respect to each other permitting rotation past each other when the clutch assembly is disengaged. A clutch piston is configured to be moved by hydraulic pressure toward the clutch pack to engage the clutch assembly. Clutch return springs engage the clutch piston and move the clutch piston away from the clutch pack to disengage the clutch assembly. A brake assembly may be arranged between the clutch assembly and the output shaft to apply a braking force for stopping rotation of the output shaft when power is not being delivered to the piece of industrial equipment. The brake assembly may include a brake pack having interleaved brake plates configured to clamp against each other to apply the braking force. A brake piston is arranged at a first side of the brake pack. A brake pressure cavity is configured to receive hydraulic oil to create hydraulic pressure that pushes the brake piston toward the brake pack. A brake piston stop is arranged to limit movement of the brake piston toward the brake pack. Brake piston springs bias the brake piston in a first direction toward the brake pack. A brake backing plate is arranged at an opposite side of the brake pack than the brake piston. A pin(s), which may be implemented as a set of pins, extends between the clutch piston and the brake backing plate to translate movement of the clutch piston away from the clutch pack into movement of the brake backing plate toward the brake pack. A control system selectively commands application of a high-energy braking force or a low-energy braking force through the brake assembly for slowing rotation of the output shaft. The high-energy braking force corresponds to the brake plates of the brake pack clamped against each other with a relatively greater clamping force when the brake piston engages the brake piston stop and the clutch return springs bias the clutch piston, the pin(s), and brake backing plate toward the brake pack. The low-energy braking force corresponds to the brake plates of the brake pack clamped against each other with a relatively lesser clamping force when hydraulic pressure is released from the brake pressure cavity such that substantially the entirety of the relatively lower clamping force is provided by the biasing force of the brake piston springs.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which.

Figure 1:
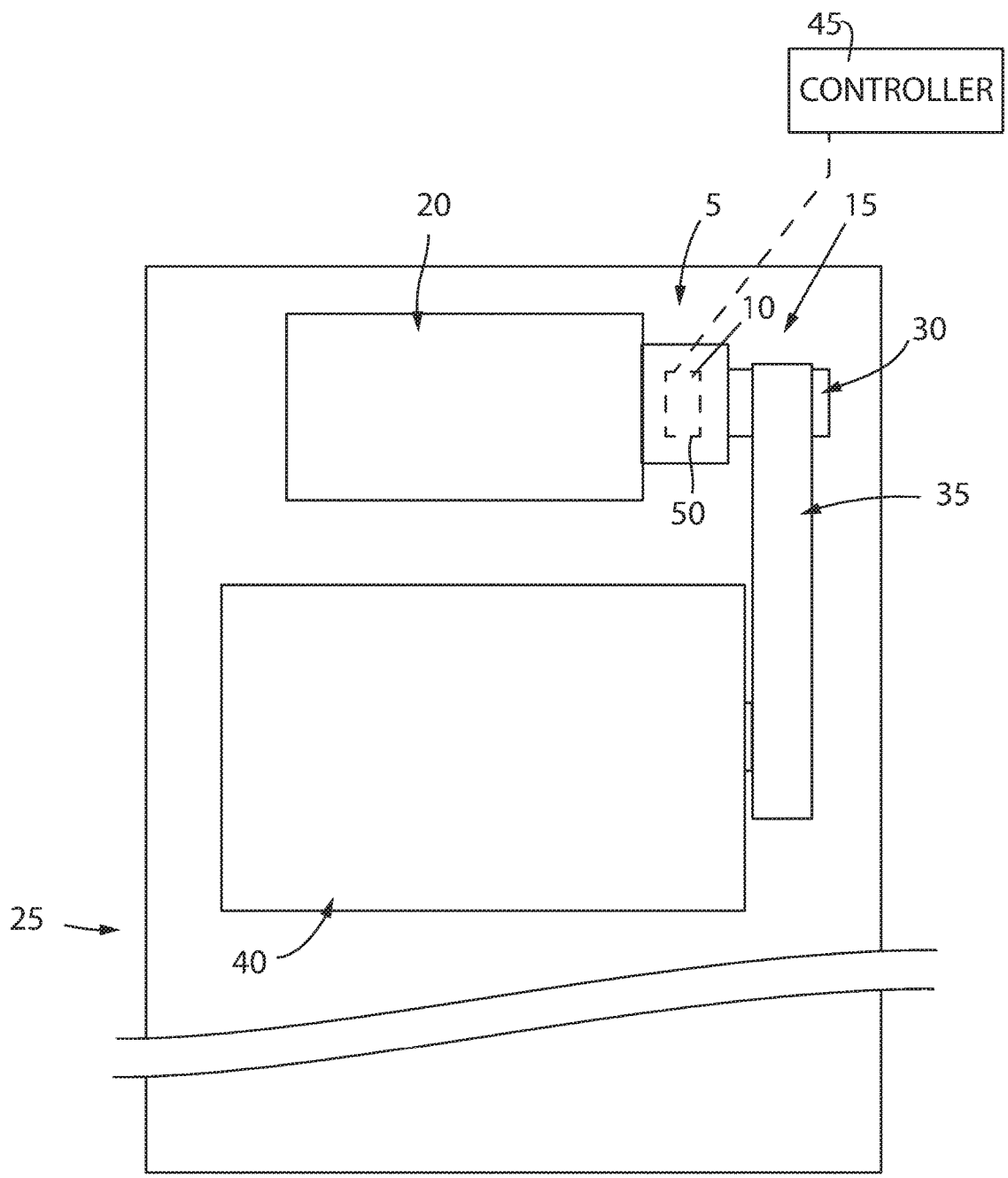
FIG. 1 is a simplified schematic representation of a piece of industrial equipment with an industrial drive incorporating a hydraulic PTO (power take-off) with a multiple-force brake system.

In describing preferred embodiments of the invention, which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Referring now to the simplified schematic representation in FIG. 1, a hydraulic PTO (power take-off) 5, with a multiple-force brake system 10, is shown implemented in an industrial drive 15. The industrial drive 15 delivers power from a prime mover 20, which may be a high-power internal combustion engine to a piece of industrial equipment 25. Industrial drive 15 is shown here configured for side-load power delivery and includes a pulley arrangement 30 and belt(s) 35 that transmit power from hydraulic PTO 5 to a driven component(s) of the industrial equipment 25. The industrial equipment 25 may be, for example, a whole-tree chipper or other industrial wood chipper, a heavy-duty pump system, a grinder, a crusher, a dredge, a shredder, or a heavy-duty drill system that has a large rotating mass such as a rotatable component(s) 40 that establishes large inertial loads while rotating. A control system 45 includes a computer that executes various medium-stored programs while receiving inputs from, and sending commands to, the hydraulic PTO 5 to control the hydraulic PTO 5 and may further control other components of the industrial drive 15, prime mover 20, and/or other components of the industrial equipment 25. Control system 45 may include the TDEC-050 electronic control system available from Twin Disc®, Inc. for controlling the hydraulic PTO 5 by controlling the various electronic, electromechanical, and hydraulic systems and/or other components of the hydraulic PTO 5 to control hydraulic fluid flow to actuate components to selectively engage and disengage components of multiple-force brake system 10. This may include toggling between high and low energy braking engagements during a stopping event, as explained in greater detail elsewhere herein.

Figure 2:
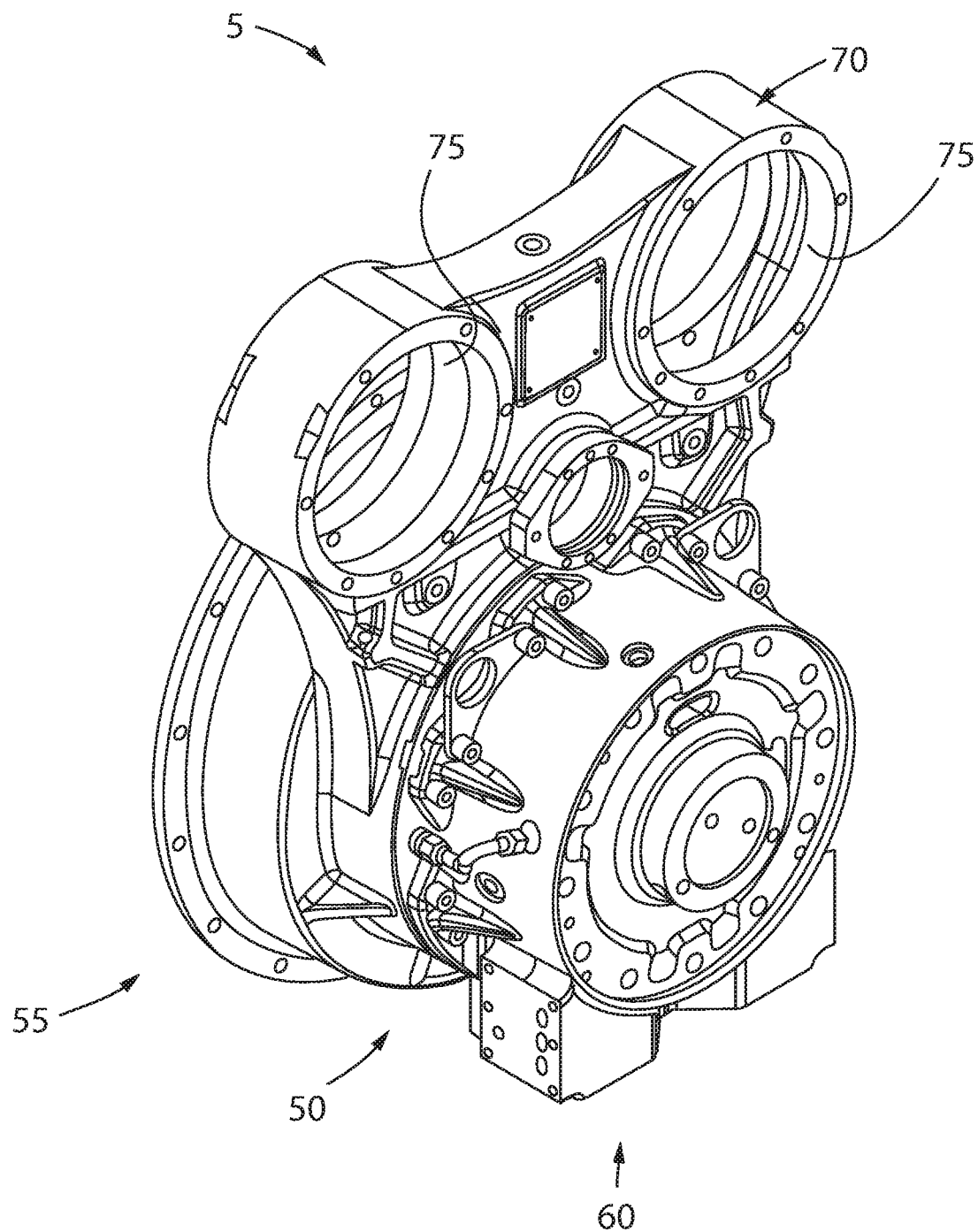
FIG. 2 is a pictorial view of the hydraulic PTO of FIG. 1.
Figure 3:
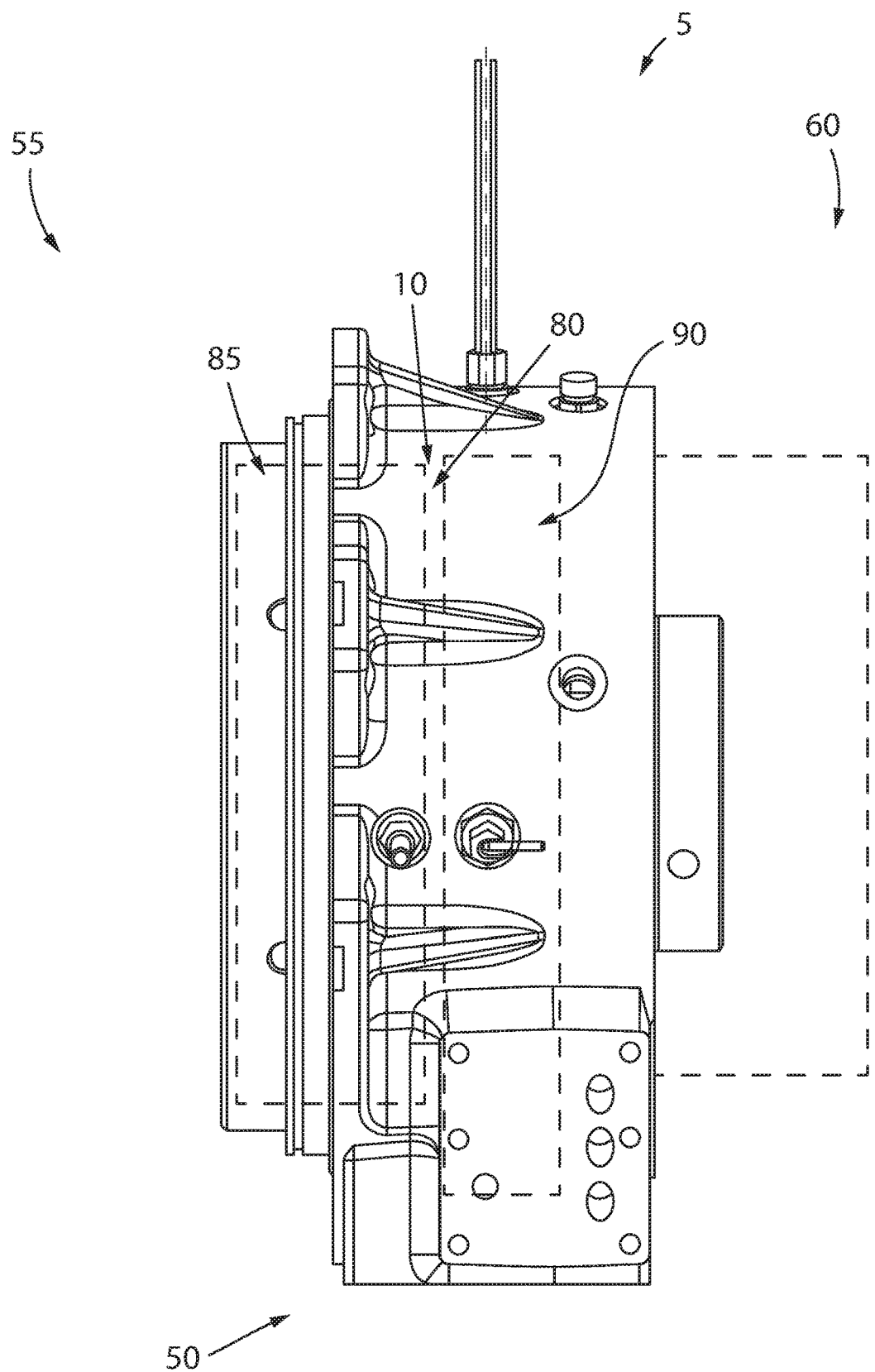
FIG. 3 is a side elevation view of a portion of the hydraulic PTO of FIG. 2.
Figure 4:
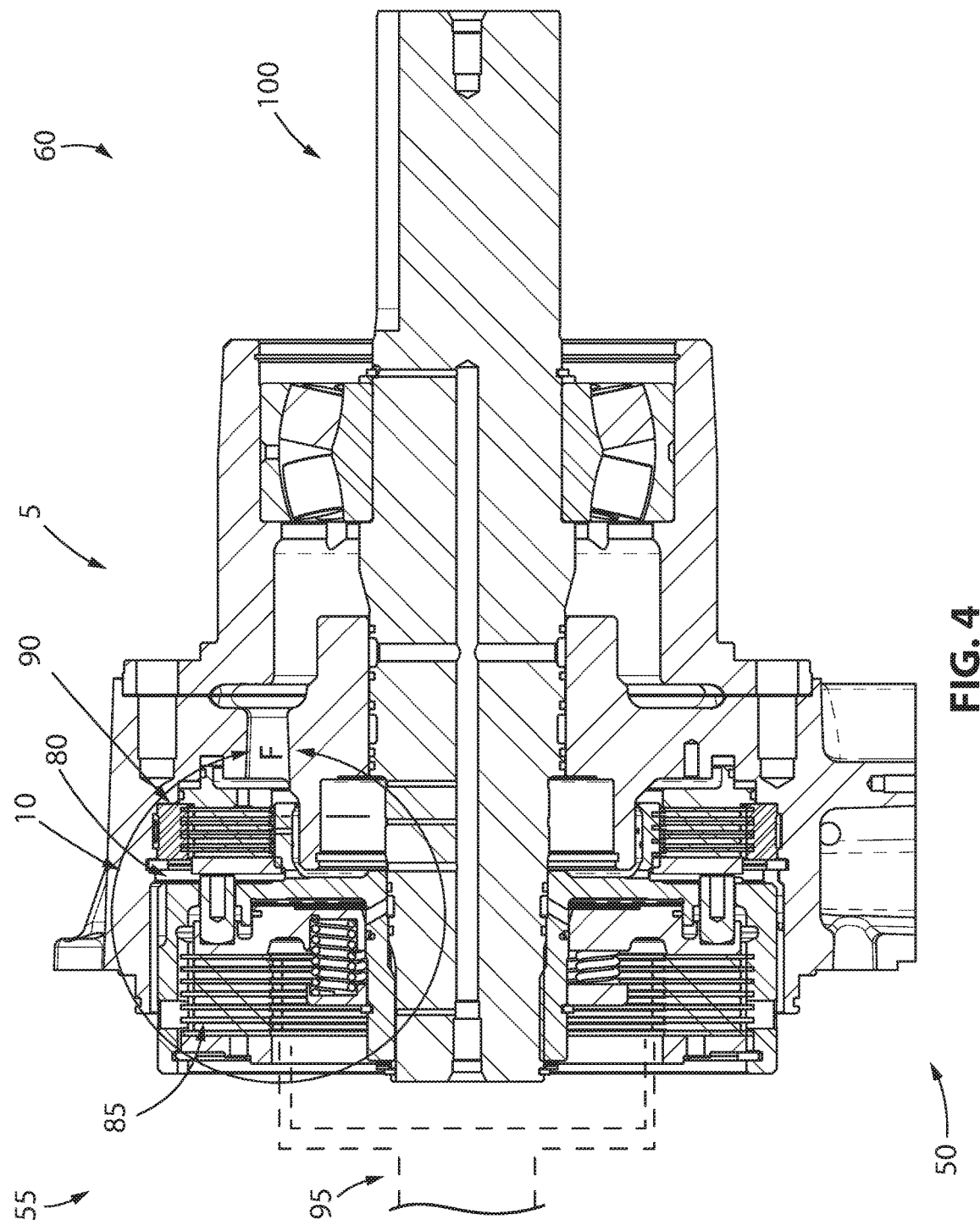
FIG. 4 is a longitudinal cross-sectional view of a portion of the hydraulic PTO of FIG. 2.
Figure 5:
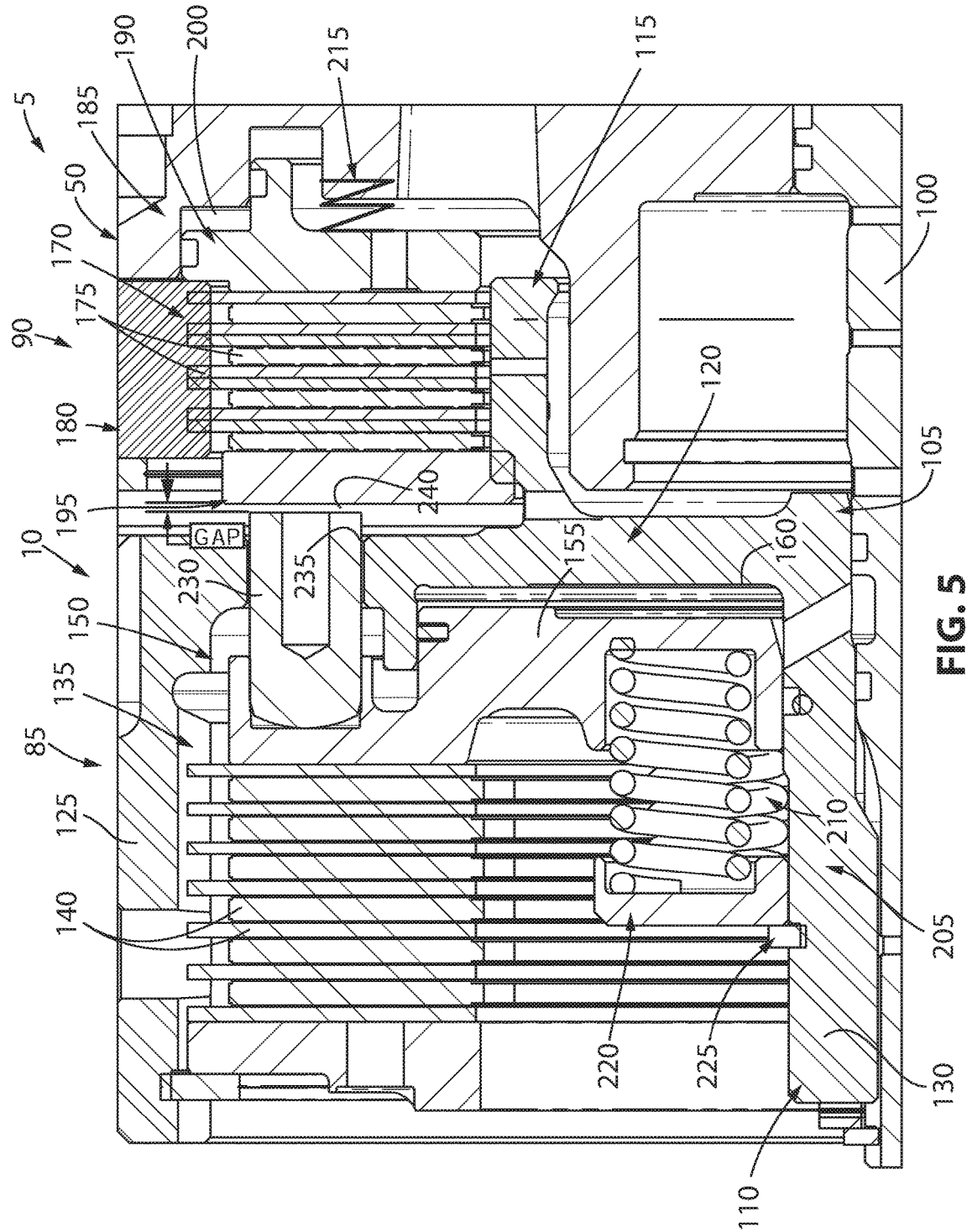
FIG. 5 is a longitudinal cross-sectional view of a portion of the hydraulic PTO of FIG. 2 with the clutch assembly engaged and the brake assembly disengaged.
Figure 6:
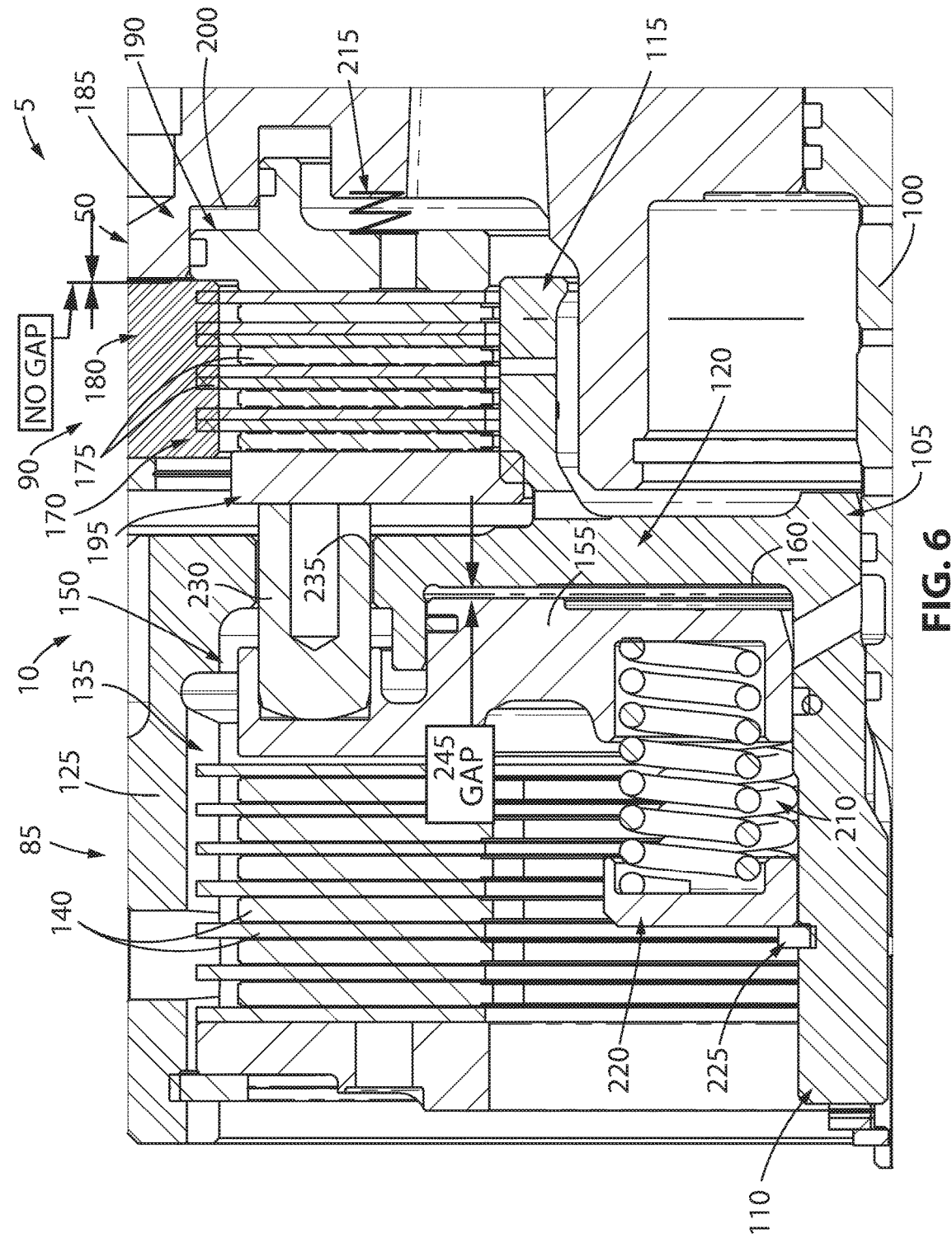
FIG. 6 is a longitudinal cross-sectional view of a portion of the hydraulic PTO of FIG. 2 with the clutch assembly disengaged and the brake assembly in a high-energy brake engagement state.
Figure 7:
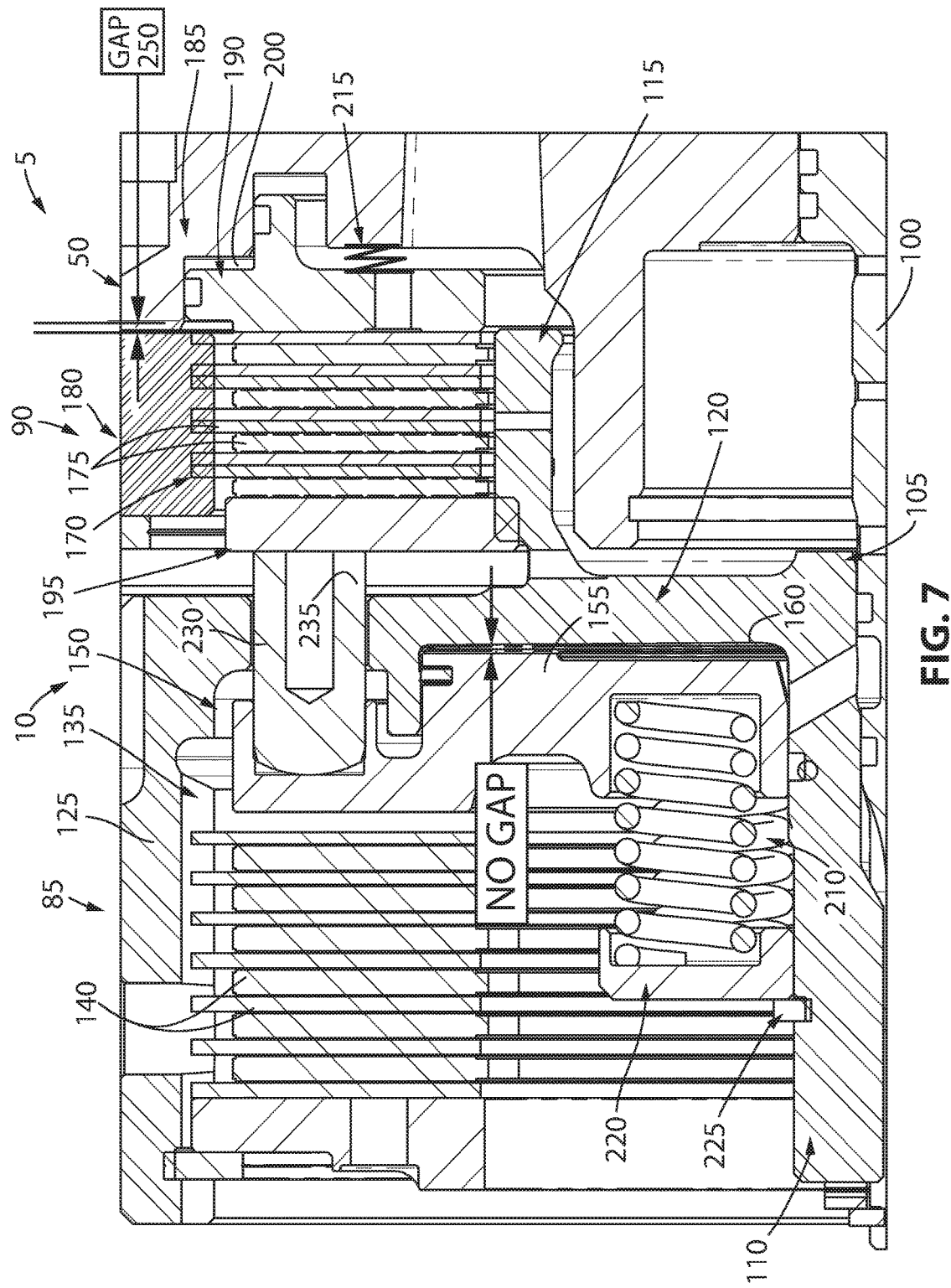
FIG. 7 is a longitudinal cross-sectional view of a portion of the hydraulic PTO of FIG. 2 with the clutch assembly disengaged and the brake assembly in a low-energy brake engagement state.

Referring to FIG. 2, hydraulic PTO 5 includes a housing 50 with an input end 55, an output end 60 or, as shown here, a pump tower 70 shown with two pump pads 75 arranged between the input and output ends 55, 60. Referring to FIGS. 3 and 4, multiple-force brake system 10 is arranged inside of the housing 50. Referring now to FIG. 4, multiple-force brake system 10 includes a clutch and brake arrangement 80 having a clutch assembly 85 and brake assembly 90. Clutch assembly 85 receives power from an input shaft 95 toward the housing input end 55 and selectively delivers power to output shaft 100 toward the housing output end 60. Brake assembly 90 is shown here as a multi-disc or multi-plate wet brake system that is configured to slow the rotational speed of output shaft 100 by selectively using different clamping or braking forces as controlled by control system 45. FIGS. 5-7 show the multiple-force brake system 10 in different states of clutch engagement and braking force application.

Referring now to FIG. 5, multiple-force brake system 10 is shown with the clutch assembly 85 on or engaged and the brake assembly 90 off or disengaged to transmit power through the hydraulic PTO 5. A drum assembly 105 interconnects the clutch assembly 85 and brake assembly 90 by way of a clutch drum 110 and a brake collar 115 with a flange 120 that extends between and connects the clutch drum 110 with the brake collar 115 to each other. Clutch drum 110 is spline-mounted to output shaft 100 and has outer and inner circumferential clutch drum side walls 125, 130.

Still referring to FIG. 5, clutch assembly 85 has a clutch pack 135 with interleaved clutch plates 140. A first set of clutch plates 140 of clutch pack 135 is locked into rotational unison with clutch drum 110 through engagement of outwardly facing tabs of the clutch plates 140 with splined grooves of an inner surface of an outer clutch drum side wall 125. A second set of clutch plates 140 of clutch pack 135 is locked into rotational unison with input shaft 95 (FIG. 4) through engagement of inwardly facing tabs of the clutch plates 140 with splined grooves of an outer surface of the input shaft 95. A clutch piston assembly 150 with a clutch piston 155 that moves to compress the clutch plates 140 against each other and lock the clutch plates 140 into rotational unison when hydraulic fluid is introduced into a clutch pressure cavity 160 is also provided. This engagement of clutch assembly 85 allows the clutch pack 135 to translate rotation of the input shaft 95 (FIG. 4) into rotation of the output shaft 100.

Still referring to FIG. 5, brake assembly 90 has a brake stack or brake pack 170 with interleaved brake plates 175. A first set of brake plates 175 of brake pack 170 is locked against rotation with respect to housing 50 through engagement of outwardly facing tabs of the brake plates 175 with inwardly facing splined grooves of an inner surface of housing 50 or, as shown here, a brake ring 180 so that the first set of brake plates 175 is rotationally fixed with respect to the brake ring 180. Brake ring 180 is configured to be selectively locked against rotation with respect to housing 50 or released and mechanically disconnected to allow the brake ring 180 to rotate with respect to housing 50, as explained in greater detail elsewhere herein. A second set of brake plates 175 of brake pack 170 has inwardly facing tabs that are received in outwardly facing splined grooves of an outer surface of brake collar 115 of drum assembly 105, which locks the second set of brake plates 175 into rotational unison with output shaft 100 through the drum assembly 105. The brake plates 175, brake ring 180, and brake collar 115 are shown with annular configurations, when viewed from end views, and concentrically arranged within an annular brake assembly opening of the PTO housing 50. A brake piston assembly 185 has a brake piston 190 that can be hydraulically actuated to move to compress the brake plates 175 against each other as supported by a backing plate 195 and clutch piston assembly 150 when hydraulic fluid is introduced into a brake pressure cavity 200 for creating frictional drag between the fixed and rotating brake plates 175 to brake the output shaft 100. Backing plate 195 floats like the other brake plates 175 and transfers the force of the clutch piston 155 when the clutch assembly 85 is not activated.

Referring again to FIGS. 5-7, a multiple-force spring system 205 allows the multiple-force brake system 10 to provide different braking forces of different magnitudes at different times, as controlled by control system 45 (FIG. 1). Multiple-force spring system 205 includes multiple springs, shown here as high-strength springs 210 as a first set of springs, shown as clutch return springs, and low-strength springs 215 as a second set of springs, shown as brake piston springs. Each of high-strength springs 210 is supported at one end by a plate 220 held by a retainer 225 at the clutch drum 110 and, at a second end, engages and biases the clutch piston 155 away from clutch plates 140 to disengage clutch assembly 85. Each of low-strength springs 215 is supported at one end by housing 50 and, at a second end, engages and biases the brake piston 190 toward brake plates 175 to engage brake assembly 90. Pins 230 extend through openings 235 of the drum assembly flange 120. The pins 230 are configured to allow movement of the clutch piston 155 of clutch assembly 85 toward the drum assembly flange 120 to translate into movement of back plate 195 of brake assembly 90 away from the drum assembly flange 120 and toward the brake piston 190.

Referring again to FIG. 5, when the clutch assembly 85 is engaged, hydraulic pressure in the clutch pressure cavity 160 moves the clutch piston 155 to compress the clutch pack 135, which compresses the high-strength springs 210 and unloads pin 230 to allow the pin 230 to disengage from back plate 195 of the brake assembly 90. This simultaneously engages the clutch assembly 85 and disengages or turns off brake assembly 90 because low-strength springs 215 can remain fully extended and unloaded, with no resistance or stop provided by pins 230 because the pins 230 are slid out of engagement with back plate 195, which defines a clearance or gap 240. It is contemplated that back plate 195 could be attached to the pins 230 with screws or other fasteners to pull the back plate 195 away from the brake pack 170 during a clutch engagement.

Referring now to FIG. 6, multiple-force brake system 10 is shown with the clutch assembly 85 off or disengaged and the brake assembly 90 on or engaged to provide braking of output shaft 100 with a relatively high-energy brake engagement. In the high-energy brake engagement state of multiple-force brake system 10, the high-strength springs 210 provide the braking pressure to the brake assembly 90. This is done by introducing oil into the brake pressure cavity 200 to create hydraulic pressure that pushes brake piston 190 toward the brake pack 170 until the brake piston 190 hits a stop provided by an abutment or engagement between the brake piston 190 and an end surface of the brake ring 180. The hydraulic pressure is maintained to hold the brake piston 190 against the stop at the brake ring 180. The clutch assembly 85 is turned off or disengaged by relieving hydraulic pressure from the clutch pressure cavity 160. The high-strength springs 210 push the clutch piston 155 away from the clutch pack 135, which axially loads and pushes pin 230 against back plate 195, with the movement permitted by a clearance or gap 245 and defined between clutch piston 155 and drum assembly flange 120. The translation of movement of the clutch piston 155 through the pin 230 to push against back plate 195 compresses brake pack 170 with a relatively high clamping force provided by high-strength springs 210, which provides a high-energy braking force.

Referring now to FIG. 7, multiple-force brake system 10 is shown with the clutch assembly 85 off or disengaged and the brake assembly 90 on or engaged to provide braking of output shaft 100 with a relatively low-energy brake engagement. In the low-energy brake engagement state of multiple-force brake system 10, the low-strength springs 215 provide the braking pressure to the brake assembly 90. This is done by releasing hydraulic pressure from both the clutch and brake pressure cavities 160, 200. The high-strength springs 210 push the clutch piston 155 away from the clutch pack 135, against a stop provided by an abutment between the clutch piston 155 and a surface of the drum assembly flange 120. This holds the back plate 195 in a fixed position against which the low-strength springs 215 push the brake piston 190 to compress the brake pack 170, which creates a clearance or gap 250 between the brake piston 190 and the brake ring 180. The compression of brake pack 170 provided by the low-strength springs 215 provides a low-energy braking force.

Referring again to FIGS. 5-7 and with further reference to FIG. 1, during use, control system 45 (FIG. 1) controls the multiple-force brake system 10 to actively brake rotation of the rotatable component(s) 40 (FIG. 1) of the industrial equipment 25 (FIG. 1). During a braking event, the control system 45 can toggle between applications of the high-energy and low-energy braking forces. The periodic applications of the high-energy braking forces provide substantial slowing of the rotatable component(s) 40 (FIG. 1) and the periodic applications of the low-energy braking forces provide some braking effect while allowing cooling of the oil and system components of the hydraulic PTO 5.

Figure 8:
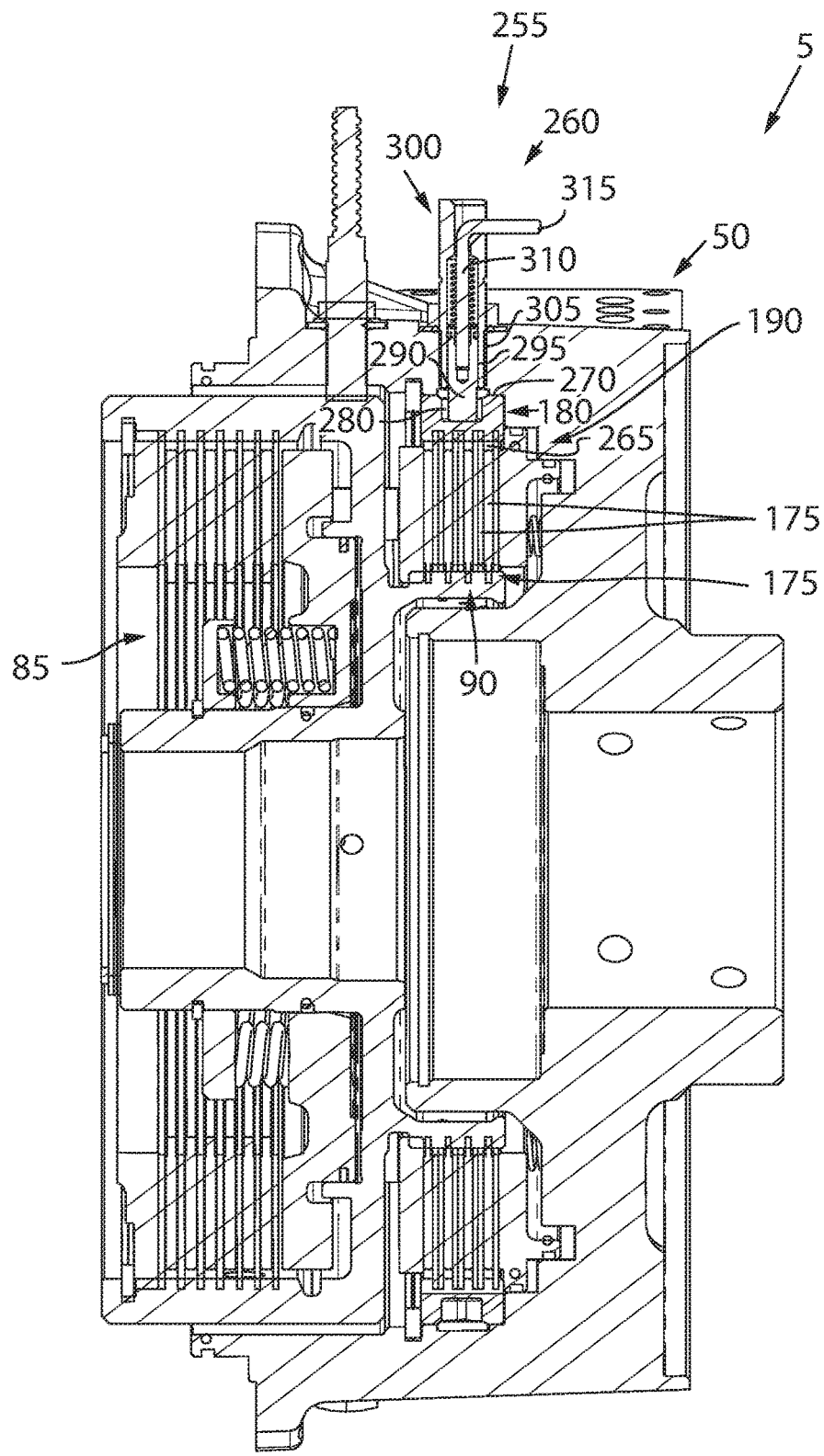
FIG. 8 is a longitudinal cross-sectional view of a portion of the hydraulic PTO of FIG. 2 showing a disconnect system.
Figure 9:
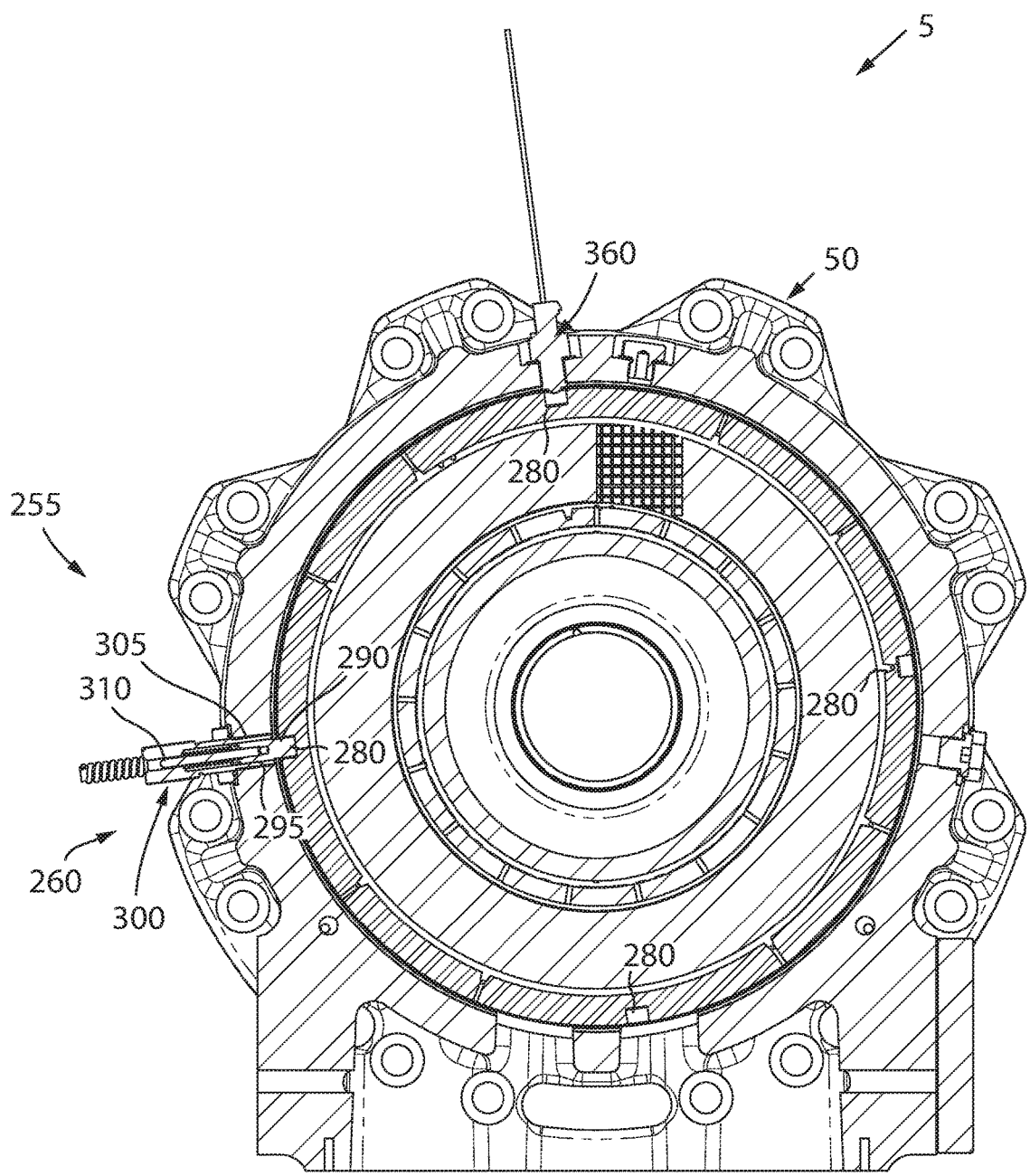
FIG. 9 is a transverse cross-sectional view of a portion of the hydraulic PTO of FIG. 2 showing the disconnect system of FIG. 8.

Referring now to FIGS. 8 and 9, hydraulic PTO 5 includes a manual service disconnect system, shown as disconnect system 255, to at least partially release the multi-disc wet brake system of brake assembly 90. This may be done by mechanically disconnecting the brake assembly 90 from its supporting components to allow rotation of the brake assembly 90 relative to PTO housing 50. When the industrial equipment 25 (FIG. 1) is in use, the brake assembly 90 is in a non-parking brake state to allow rotation of output shaft 100 (FIG. 4) relative to the brake assembly 90, such as rotation relative to the brake plates 175 that are rotationally fixed with respect to brake ring 180 and locked against rotation with respect to PTO housing 50, to deliver power to industrial equipment 25 (FIG. 1). When the industrial equipment 25 (FIG. 1) is not in use, the brake assembly 90 can be in a parking brake state, providing a parking brake effect by way of the low-energy braking force provided by the low-strength springs 215 (FIG. 5) against the multiple brake plates 175 in the brake pack 170. This prevents rotation of output shaft 100 (FIG. 4) relative to the brake assembly 90, such as relative to all of the brake plates 175 of brake pack 170.

Disconnect system 255 is configured to manually release the parking brake to place the brake assembly 90 in a parking brake disconnected state in which the brake assembly 90 is mechanically disconnected from its supporting structure of PTO housing 50 and allowed to rotate relative to the PTO housing 50. This allows rotating components of the industrial equipment 25 (FIG. 1) and/or output shaft 100 (FIG. 4) when the brake assembly 90 is in the parking brake disconnected state, as explained in greater detail elsewhere herein.

Still referring to FIGS. 8 and 9, disconnect system 255 includes brake ring 180 and disconnect lever assembly 260 that can selectively engage the brake ring 180 to lock and prevent rotation of brake ring 180 within the housing 50 during active braking or parking braking with the brake assembly 90. Disconnect lever assembly 260 can selectively release the brake ring 180 to allow rotation of brake ring 180 and rotation of output shaft 100. When the brake ring 180 is released and allowed to rotate in the housing 50, the brake assembly 90 applies a small fraction of the braking power compared to when the brake ring 180 is prevented from rotating within the housing 50. That is, because the brake ring 180 is allowed to rotate inside the housing 50, braking occurs at only a single frictional engagement surface between the outermost brake plate 175 and the piston 190, instead of multiple frictional engagements of multiple abutting surfaces of the adjacent interleaved brake plates 175 when the brake ring 180 is locked against rotation. By locking and releasing the brake ring 180 with the disconnect lever assembly 260, the disconnect system 255 converts the brake assembly 90 from a multi-plate configuration when in the parking brake state to effectively provide a single plate configuration that is substantially easier to rotate through when placed in the parking brake disconnected state.

Referring to FIGS. 8 and 9, brake ring 180 has inner and outer circumferential surfaces 265, 270. Inner circumferential surface 265 supports the brake plates 175 with the outwardly facing tabs. Outer circumferential surface 270 faces outward toward an inwardly facing surface of a wall that defines an outer boundary of the annular brake assembly opening of the PTO housing 50. Holes or brake ring pockets, shown as pockets 280, extend into the outer circumferential surface 270 of brake ring 180 and are circumferentially spaced from each other. Disconnect lever assembly 260 includes handle 315 with a plunger 290 that extends into pocket(s) 280 to lock the brake ring 180 and is withdrawn out of pocket 280 to release and allow the brake ring 180 to rotate. Plunger 290 is arranged for sliding concentrically in a bore 295 of cylindrical lever body 300 that is attached to housing 50, extending through a bore 305 of the housing 50 that is aligned with the brake ring 180 and the pockets 280.

Figure 10:
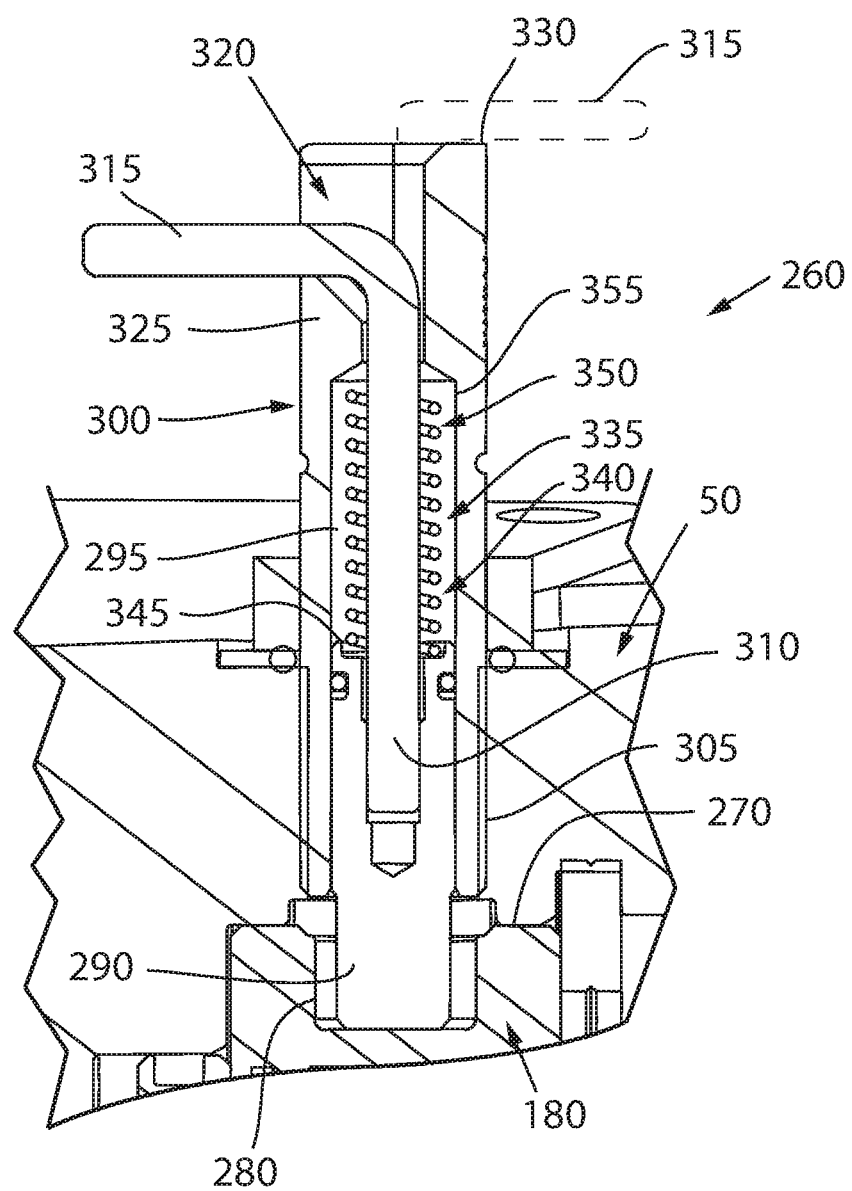
FIG. 10 is a longitudinal cross-sectional view of a disconnect lever assembly of the disconnect system of FIG. 8.

Turning to FIG. 10, pin 310 is connected to and extends outwardly from plunger 290 through bore 295, and a handle 315 extends perpendicularly from an upper end of pin 310. A slot 320 extends through a sidewall 325 of the cylindrical lever body 300. The slot 320 is configured to receive the handle 315 so that the handle 315 is advanced downwardly in the slot 320 to define a first position of handle 315 when the plunger 290 is seated in pocket 280. To withdraw the plunger 290 out of pocket 280, the handle 315 is withdrawn from the slot 320 and rotated to sit on an upper end 330 of the cylindrical lever body 300 to define a second position of handle 315, as shown in dashed outline in FIG. 10. A spring 335 is arranged concentrically between pin 310 and sidewall 325 of the cylindrical lever body 300. A lower end 340 of spring 335 sits against an upper surface 345 of plunger 290. An upper end 350 of spring 335 sits against an internal shoulder 355 of the cylindrical lever body 330. Spring 335 is a compression spring that biases the plunger 290 toward brake ring 180 so that, if handle 315 is aligned with slot 320, the plunger 290 automatically falls into a pocket 280 that rotates into alignment with the plunger 290 when the brake ring 180 rotates.

Referring again to FIG. 9, a sensor shown as switch 360 is configured to detect when the brake ring 180 is in a home position in which the disconnect lever assembly 260 locks the brake ring 180 with respect to the housing 50. Switch 360 is shown as a plunger-style switch with a switch button that remains in an extended position by extending into a pocket 280 when the brake ring 180 is in the home position, such as the position shown in FIG. 9. When the brake ring 180 is not in the home position, the button of switch 360 engages the outer circumferential surface 270 of brake ring 180, which pushes the switch button into the switch 360 as a retracted position. Switch 360 delivers a signal to control system 45 indicating whether the button is extended out indicating that the brake ring 180 is in the home position, or pushed in as the retracted position indicating that the brake ring 180 is not in the home position as an indicator of the position of the brake ring 180, which may correspond to the state of the disconnect lever assembly 260 in its locked or unlocked position(s). Control system 45 evaluates whether the brake ring 180 is in the home position to make operational choices, such as requiring the brake ring 180 to be in the home position to allow normal operation of the hydraulic PTO 5 for delivering power to the industrial equipment 25 (FIG. 1).

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:

1. A hydraulic PTO (power take-off) for use with industrial drives, the hydraulic PTO, comprising:
   a PTO housing mounted between a prime mover and a piece of driven industrial equipment;
   an output shaft extending from the PTO housing to selectively deliver power to the piece of driven equipment for driving rotation of a rotatable component of the piece of driven industrial equipment; and
   a multiple-force brake system configured to apply different braking forces at different times inside the PTO housing to control deceleration of the rotatable component of the piece of driven industrial equipment while stopping the rotation of the rotatable component of the piece of driven industrial equipment.

2. The hydraulic PTO of claim 1, further comprising a control system configured to control the multiple-force brake system to alternately pulse applications of high-energy brake engagement and low-energy brake engagement.

3. A hydraulic PTO for use with industrial drives, the hydraulic PTO, comprising:
   an input end receiving power from a prime mover;
   an output end having an output shaft selectively rotating to deliver power to a piece of industrial equipment;
   a clutch assembly receiving power from the prime mover and selectively transmitting the power into rotation of the output shaft, wherein the clutch assembly can be engaged to transmit power through the clutch assembly for rotating the output shaft and disengaged to not transmit power through the clutch assembly, the clutch assembly including,
      a clutch pack having interleaved clutch plates clamped together for rotation in unison with each other when the clutch assembly is engaged and unclamped with respect to each other permitting rotation past each other when the clutch assembly is disengaged;
      a clutch piston moved by hydraulic pressure toward the clutch pack to engage the clutch assembly;
      clutch return springs engaging the clutch piston and moving the clutch piston away from the clutch pack to disengage the clutch assembly;
   a brake assembly arranged between the clutch assembly and the output shaft to apply a braking force for stopping rotation of the output shaft when power is not being delivered to the piece of industrial equipment; the brake assembly including,
      a brake pack having interleaved brake plates configured to clamp against each other to apply the braking force;
      a brake piston arranged at a first side of the brake pack;
      a brake pressure cavity configured to receive hydraulic oil to create hydraulic pressure that pushes the brake piston toward the brake pack;
      a brake piston stop arranged to limit movement of the brake piston toward the brake pack;
      brake piston springs biasing the brake piston in a first direction toward the brake pack;
      a brake backing plate arranged at an opposite side of the brake pack than the brake piston;
      a set of pins extending between the clutch piston and the brake backing plate to translate movement of the clutch piston away from the clutch pack into movement of the brake backing plate toward the brake pack;
   a control system selectively commanding application of one of a high-energy braking force and a low-energy braking force through the brake assembly for slowing rotation of the output shaft;
      wherein the high-energy braking force corresponds to the brake plates of the brake pack clamped against each other with a relatively greater clamping force when the brake piston engages the brake piston stop and the clutch return springs bias the clutch piston, at least one pin of the set of pins, and brake backing plate toward the brake pack, and
      wherein the low-energy braking force corresponds to the brake plates of the brake pack clamped against each other with a relatively lesser clamping force when hydraulic pressure is released from the brake pressure cavity such that substantially the entirety of the relatively lower clamping force is provided by the biasing force of the brake piston springs.

4. A hydraulic PTO (power take-off) for use with industrial drives, the hydraulic PTO, comprising:
   a PTO housing mounted between a prime mover and a piece of driven industrial equipment;
   an output shaft extending from the PTO housing to selectively deliver power to the piece of driven equipment for driving rotation of a rotatable component of the piece of driven industrial equipment;
   a multiple-force brake system configured to apply different braking forces at different times inside the PTO housing to control deceleration of the rotatable component of the piece of driven industrial equipment while stopping the rotation of the rotatable component of the piece of driven industrial equipment; and
   a control system configured to control the multiple-force brake system to alternately pulse applications of high-energy brake engagement and low-energy brake engagement.

5. The hydraulic PTO of claim 4, wherein the multiple-force brake system includes a brake assembly with first and second sets of springs that provide first and second forces that correspond to the high-energy brake engagement and low-energy brake engagement.

6. The hydraulic PTO of claim 5, wherein the first set of springs is arranged to bias a clutch piston of a clutch assembly of the hydraulic PTO to disengage the clutch assembly and apply the force that corresponds to the high-energy brake engagement, and the second set of springs is arranged to bias a brake piston of a brake assembly and apply the force that corresponds to the low-energy brake engagement.

7. The hydraulic PTO of claim 4, further comprising a clutch assembly receiving power from the prime mover and selectively transmitting the power into rotation of the output shaft, wherein the clutch assembly can be engaged to transmit power through the clutch assembly for rotating the output shaft and disengaged to not transmit power through the clutch assembly.

8. The hydraulic PTO of claim 7, wherein the clutch assembly further comprises a clutch pack having interleaved clutch plates clamped together for rotation in unison with each other when the clutch assembly is engaged and unclamped with respect to each other permitting rotation past each other when the clutch assembly is disengaged.

9. The hydraulic PTO of claim 8, wherein the clutch assembly further comprises a clutch piston moved by hydraulic pressure toward the clutch pack to engage the clutch assembly and at least one clutch return spring engaging the clutch piston and moving the clutch piston away from the clutch pack to disengage the clutch assembly.

10. The hydraulic PTO of claim 4, wherein the multiple-force brake system comprises a brake assembly arranged between a clutch assembly and the output shaft to apply a braking force for stopping rotation of the output shaft when power is not being delivered to the piece of industrial equipment.

11. The hydraulic PTO of claim 10, wherein the brake assembly further comprises a brake pack having interleaved brake plates configured to clamp against each other to apply the braking force.

12. The hydraulic PTO of claim 11, wherein the brake assembly further comprises a brake piston arranged at a first side of the brake pack and a brake pressure cavity configured to receive hydraulic oil to create hydraulic pressure that pushes the brake piston toward the brake pack.

13. The hydraulic PTO of claim 12, wherein the brake assembly further comprises a brake piston stop arranged to limit movement of the brake piston toward the brake pack.

14. The hydraulic PTO of claim 13, wherein the brake assembly further comprises at least one brake piston spring biasing the brake piston in a first direction toward the brake pack and a brake backing plate arranged at an opposite side of the brake pack than the brake piston.

15. The hydraulic PTO of claim 14, wherein the high-energy braking force corresponds to the brake plates of the brake pack clamped against each other with a first clamping force when the brake piston engages the brake piston stop and the at least one clutch return spring bias the clutch piston.

16. The hydraulic PTO of claim 15, wherein the low-energy braking force corresponds to the brake plates of the brake pack clamped against each other with a second clamping force that is less than the first clamping force when hydraulic pressure is released from the brake pressure cavity such that substantially the entirety of the second clamping force is provided by the biasing force of the at least one brake piston spring.

17. The hydraulic PTO of claim 16 further comprising a control system selectively commanding application of one of a high-energy braking force and a low-energy braking force through the brake assembly for slowing rotation of the output shaft by controlling application of the first and second clamping forces.

* * * * *